UNITED STATES PATENT OFFICE.

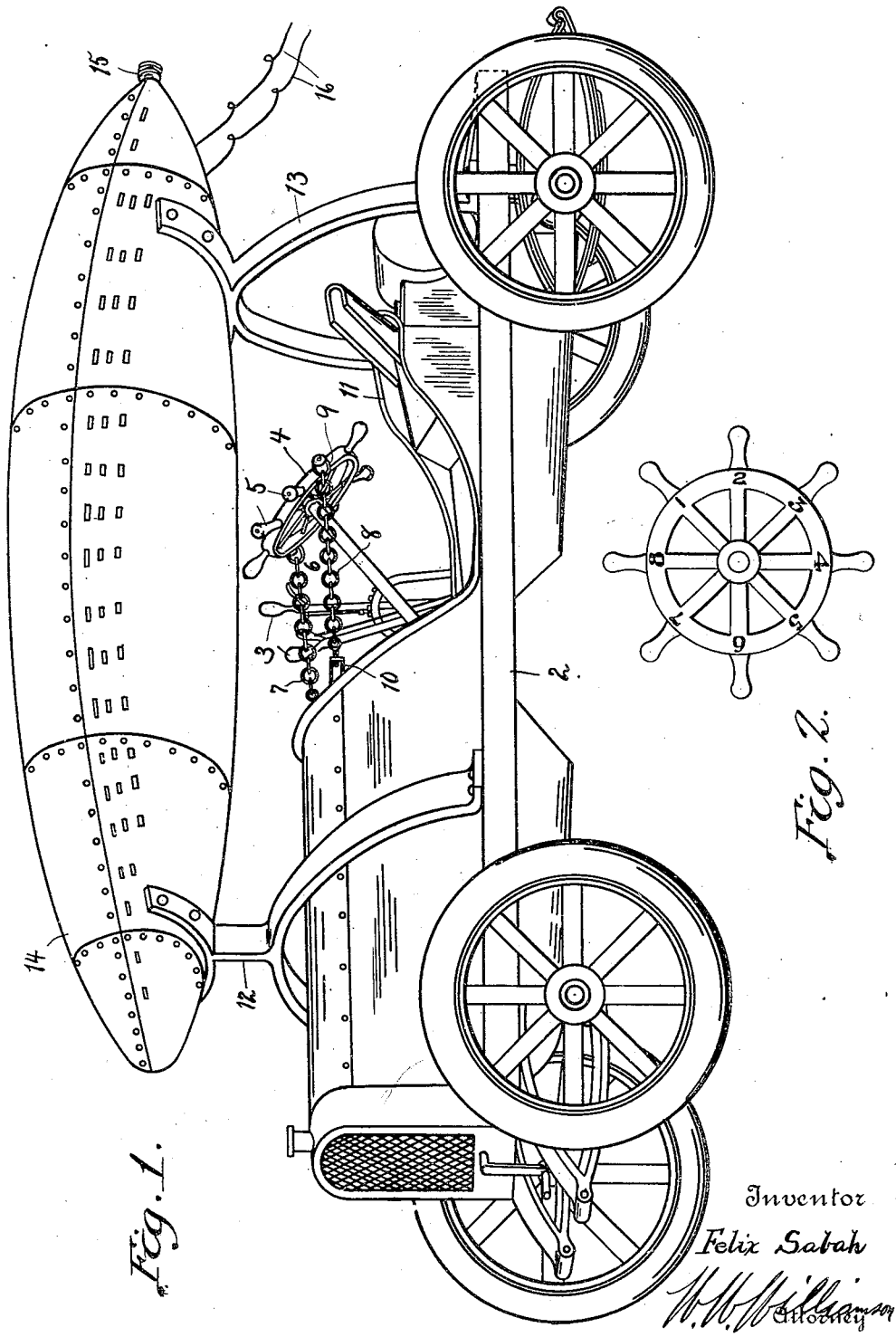

FELIX SABAH, OF PHILADELPHIA, PENNSYLVANIA.

WAR-AUTOMOBILE.

1,228,603.  Specification of Letters Patent.  Patented June 5, 1917.

Application filed August 3, 1916. Serial No. 113,005.

*To all whom it may concern:*

Be it known that I, FELIX SABAH, a citizen of the United States, residing at Philadelphia, in the county of Philadelphia and State of Pennsylvania, have invented new and useful Improvements in War-Automobiles, of which the following is a specification.

My invention relates to new and useful improvements in war automobiles, and has for its object to provide an exceedingly simple and effective construction, whereby a torpedo, mine or very large shell may be mounted on the automobile and carried to its destination or point of explosion, so that the same may be fired in the midst of the enemy.

A further object of the invention is to provide a mine or torpedo and suitable supports for mounting the same upon an automobile, so that when the mine or torpedo is exploded, it will wreck the automobile and throw forth a shower of missiles.

Another object of the invention is to construct an automobile for carrying a mine or torpedo which may be run without an operator and which may be started by a person standing upon the ground.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which—

Figure 1 is a perspective view of my improved war automobile.

Fig. 2 is a face view of the steering wheel shown in Fig. 1.

In carrying out my invention as here embodied 2 represents an automobile which should be of relatively light and cheap material, but provided with a motor of high power and speed. The automobile is provided with the necessary starting or gear shifting levers 3 arranged at one side and projecting a sufficient distance therefrom, so that a person standing upon the ground may readily manipulate the same, so that said person will not be hit by any part of the machine when the same is started. A steering wheel 4 is provided which may be of any desirable construction, but preferably in the form of an eight spoked wheel having handles 5 projecting from its rim and when properly set, this wheel is locked in any desirable manner, one form of locking device 6 being here shown, which consists of two chains 7 and 8 each provided at one end with a ring 9 adapted to pass over any one of the handles 5, and each chain having at its other end a turn-buckle 10, whereby the slack in the chains may be taken up, thereby securely locking the steering wheel in any adjusted position, and if found desirable, this wheel may be provided with designating numbers, such as 1 to 8, whereby the front wheels of the automobile may be set in the direction it is desired that the automobile should follow.

The automobile is also provided with a seat 11 for use by a person testing the machine to see that all of the parts are in the proper working order, before the automobile is placed in commission. The seat may also be used by an operator in running the automobile to the place where it is to be used, and for setting and aiming the automobile and setting the steering wheel.

At the front and rear ends of the automobile are secured two crotches or forked supporting members 12 and 13 respectively, the lower ends being securely fastened to some suitable part of the automobile, such as the chassis frame, and in these forked supporting members is mounted the mine or torpedo 14 the same being secured to the supporting members in any suitable and well known manner. This mine, torpedo or shell is filled with gun powder or other suitable high explosive, and when desired it may also have therein shrapnel, ordinary bullets or other suitable missiles, so that when said torpedo is exploded the missiles will be thrown in different directions for killing or wounding the enemy. The mine or torpedo is exploded in any suitable and well known manner as by a fuse 15 or by the use of electrical firing means located in the rear end of the torpedo from which run the wires 16 to the lines of the army using the automobile, where said wires are connected with a suitable electrical contact mechanism.

In practice the automobile is aimed or set to run to the desired point in the lines of the enemy and the steering wheel then locked. If the person setting the steering wheel has done so from the seat of the automobile he then gets out, and starts the machine by manipulating the proper levers, when the machine will start off by itself and run along until the desired point is reached. As soon as the automobile is within the lines of the enemy the mine or torpedo is exploded in any manner desired causing the entire device to be blown up with an enormous loss of life and property.

Since an automobile of this description may be built having great speed, it will be very difficult for the enemy to stop or destroy the same before it reaches the point desired, and in actual use the torpedo should be so constructed that the explosion will not back fire or the missiles be thrown rearwardly, but should spread forward when fired.

Of course I do not wish to be limited to the exact details of construction as here shown, as these may be varied within the limits of the appended claims without departing from the spirit of my invention.

Having thus fully described my invention, what I claim as new and useful, is—

1. The combination in an automobile of the character described, of a steering wheel having a number of projections, a plurality of chains connected to relatively fixed parts of the automobile, each chain having a ring designed to embrace any of said projections, and means for drawing the chains taut whereby the steering wheel is held against rotary movement, substantially as described.

2. The combination in an automobile of the character described, of a steering wheel having a number of projections, a plurality of chains connected to relatively fixed parts of the automobile, each chain having a ring designed to embrace any of said projections, and markings on said wheel located adjacent respective projections, said markings being indicative of pre-determined directions in which the automobile will travel when the rings are placed over said respective projections, substantially as described.

3. In combination an automobile provided with a steering wheel and having starting levers arranged on the side thereof and projecting some distance therefrom, means for locking the steering wheel in any adjusted position, a pair of forked supports one secured adjacent the front end of the automobile, the other adjacent the rear end thereof, and a torpedo mounted in and secured to said supports some distance above the automobile, said torpedo provided with means for exploding the same.

In testimony whereof, I have hereunto affixed my signature.

FELIX SABAH.